(12) United States Patent
Boudreaux et al.

(10) Patent No.: US 7,091,743 B2
(45) Date of Patent: Aug. 15, 2006

(54) DATA ACKNOWLEDGMENT USING IMPEDANCE MISMATCHING

(75) Inventors: Michael J. Boudreaux, Swanton, VT (US); Adam J. Courchesne, Jericho, VT (US); Jason M. Norman, South Burlington, VT (US); Mark S. Styduhar, Hinesburg, VT (US); Sebastian T. Ventrone, South Burlington, VT (US)

(73) Assignee: International Business Machines Corporation, Armonk, NY (US)

( * ) Notice: Subject to any disclaimer, the term of this patent is extended or adjusted under 35 U.S.C. 154(b) by 378 days.

(21) Appl. No.: 10/680,756

(22) Filed: Oct. 7, 2003

(65) Prior Publication Data

US 2005/0076170 A1    Apr. 7, 2005

(51) Int. Cl.
  *H03K 17/16*    (2006.01)
(52) U.S. Cl. ............... 326/30; 326/86; 327/108; 710/305
(58) Field of Classification Search ............... 326/30; 327/108
  See application file for complete search history.

(56) References Cited

U.S. PATENT DOCUMENTS

| | | | |
|---|---|---|---|
| 6,177,807 B1 | 1/2001 | Bertin et al. | |
| 6,639,423 B1 * | 10/2003 | Martin et al. | 326/30 |
| 6,677,778 B1 * | 1/2004 | Lindsay et al. | 326/30 |
| 2002/0078282 A1 | 6/2002 | Drerup et al. | |
| 2002/0138678 A1 | 9/2002 | Kim et al. | |
| 2002/0161959 A1 | 10/2002 | Apostol, Jr. et al. | |
| 2002/0161978 A1 | 10/2002 | Apostol, Jr. et al. | |
| 2002/0190746 A1 * | 12/2002 | Abrosimov et al. | 326/30 |
| 2002/0190762 A1 * | 12/2002 | Mooney et al. | 327/108 |

* cited by examiner

*Primary Examiner*—Vibol Tan
(74) *Attorney, Agent, or Firm*—Schmeiser, Olsen & Watts; William H. Steinberg

(57) ABSTRACT

A structure and associated method to control a flow of data on a semiconductor device. A transmitter, receiver and transmission line are formed within the semiconductor device. The transmitter, receiver, and transmission line are adapted to control data transfer between a first core and a second core within the semiconductor device. The transmitter is adapted to send a signal over the transmission line to the receiver adapted to receive the signal. The receiver is further adapted to create an impedance mismatch to indicate that the second core is unable to transfer the data. The transmitter is adapted to detect the impedance mismatch.

18 Claims, 4 Drawing Sheets

DATA ACKNOWLEDGMENT USING IMPEDANCE MISMATCHING

BACKGROUND OF THE INVENTION

1. Technical Field

The present invention relates to a structure and associated method to control data transfer between cores on a system on a chip.

2. Related Art

Electronic components in a circuit typically require complicated protocols to communicate with each other. Complicated protocols may require additional circuitry making the circuit bulky and costly. Therefore there exists a need to create a simple communication protocol.

SUMMARY OF THE INVENTION

The present invention provides a semiconductor device, comprising:

a transmitter, receiver, and transmission line formed within the semiconductor device, wherein the transmitter, receiver, and transmission line are adapted to control data transfer between a first core and a second core within the semiconductor device, wherein the transmitter is adapted to send a signal over the transmission line to the receiver adapted to receive the signal, wherein the receiver is further adapted to create an impedance mismatch to indicate that the second core is unable to transfer the data, and wherein the transmitter is adapted to detect the impedance mismatch.

The present invention provides a method for controlling data transfer, comprising:

providing a transmitter, a receiver, and a transmission line for controlling the data transfer between a first core and a second core within a semiconductor device;

sending, by the transmitter, a signal over the transmission line to the receiver;

creating, by the receiver, an impedance mismatch to indicate that the second core is unable to transfer the data between the first core and the second core; and detecting, by the transmitter, the impedance mismatch.

The present invention advantageously provides a simple communication protocol.

DETAILED DESCRIPTION OF THE INVENTION

Figure 1:
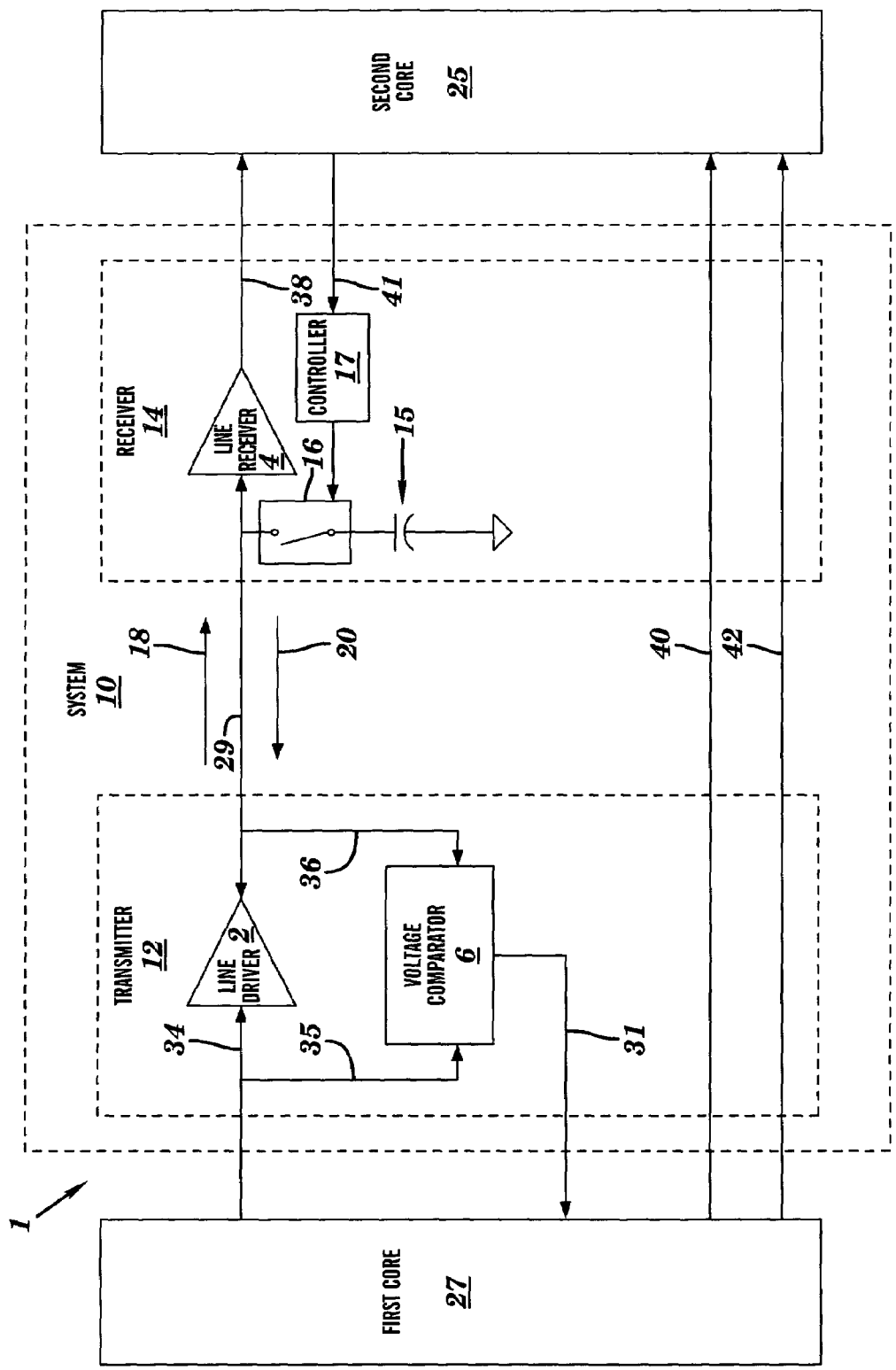
FIG. 1 is a block diagram view of a semiconductor device comprising a system to control data transfer, in accordance with embodiments of the present invention

FIG. 1 is a block diagram view of a semiconductor device 1 comprising a system 10 to control data transfer between a first core 27 and a second core 25, in accordance with embodiments of the present invention. A core is defined herein as a functional area (i.e., adapted to perform a specified function) on the semiconductor device 1. The semiconductor device 1 may comprise a system on a chip (SOC). In FIG. 1, the semiconductor device 1 comprising the system 10, the first core 27, and the second core 25 are shown for illustrative purposes. The semiconductor device 1 may comprise a plurality of cores equivalent to each of the first core 27 and the second core 25. Additionally, the semiconductor device 1 may comprise a plurality of systems equivalent to the system 10. The system 10 is an interface for controlling the data flow between the first core 27 and the second core 25. The system 10 comprises a transmitter 12, a receiver 14, and a transmission line 29. The transmitter 12 comprises a line driver 2 for enhancing a voltage signal (i.e., creating a higher signal level) for transmission across the transmission line 29 and a voltage comparator 6 for comparing a plurality of voltage signal levels. The receiver 14 comprises a line receiver 4 for detecting the voltage signal from the transmission line 29 and applying the detected voltage signal to the second core 25, a capacitor 15 for changing an impedance of the transmission line 29, a switch 16 for connecting the capacitor 15 to the transmission line 29, and a controller 17 for enabling and disabling the switch 16. An address bus 42 allows the first core 27 to address specific locations in the second core 25. The data is transferred between the first core 27 and the second core 25 over a data bus 40. The first core 27 is adapted to make a request to the second core 25 for the data transfer. The request comprises the voltage signal transmitted from the first core 27 to the second core 25 via transmission line 29. The second core 25 may be unable to acknowledge any requests for data transfer with the first core 27 because the second core 25 may be busy performing other functions (e.g., performing a data transfer with another core). If the second core 25 is busy, a signal will be sent from the second core 25 over link 41 to the controller 17 in the receiver 14 before any request for data transfer is made. The controller 17 will enable the switch 16 thereby connecting the capacitor 15 to the transmission line 29. The capacitor 15 will create an impedance mismatch by changing an impedance of the transmission line 29 on the receiver 4 side. Connecting the capacitor 15 to the transmission line 29 changes the impedance of the transmission line 29 because it changes the capacitive component $Z_C$ of the impedance of the transmission line 29. The following formula shows the relationship between $Z_C$ and the capacitance C of the capacitor 15: $Z_C=1/(2*Pi*f*C)$ ohms, (f=frequency of signal).

The following process occurs after the receiver 14 has created the impedance mismatch because the second core 25 is not ready for the data transfer. The first core 27 transmits a request voltage signal (herein referred to as incident voltage) for a data transfer over link 34 to the line driver 2 for transmission on the transmission line 29. The incident voltage is also transmitted over link 35 to the voltage comparator 6. The line driver 2 sends the incident voltage over the transmission line 29 in a direction 18 to the line receiver 4. A voltage (herein referred to as reflected voltage) is reflected back over the transmission line 29 in a direction 20 from the line receiver 4 to the voltage comparator 6. The impedance mismatch will cause an amplitude of the reflected voltage to be greater than or less than an amplitude of the incident voltage. The amplitude of the reflected voltage is compared to the amplitude of the incident voltage by the voltage comparator and if said amplitudes differ then an error signal is generated and sent to the first core 27 as to the amplitude mismatch so that the first core 27 may terminate the data flow.

When the second core 25 is ready to transfer the data, the impedance mismatch is disabled by disabling the switch 16 thereby removing the connection between the capacitor 15 and the transmission line 29. Removing the capacitor causes the impedance of the transmission line 29 on the receiver 4 side to be matched with the impedance of the transmission line 29 on transmitter 2 side. The impedance match causes the amplitude of the reflected voltage to be about equal to the amplitude of the incident voltage as detected by the voltage comparator. The voltage comparator sends a signal to the first core 27 as to the matching of said amplitudes so that the first core 27 may establish the data flow.

Figure 2:
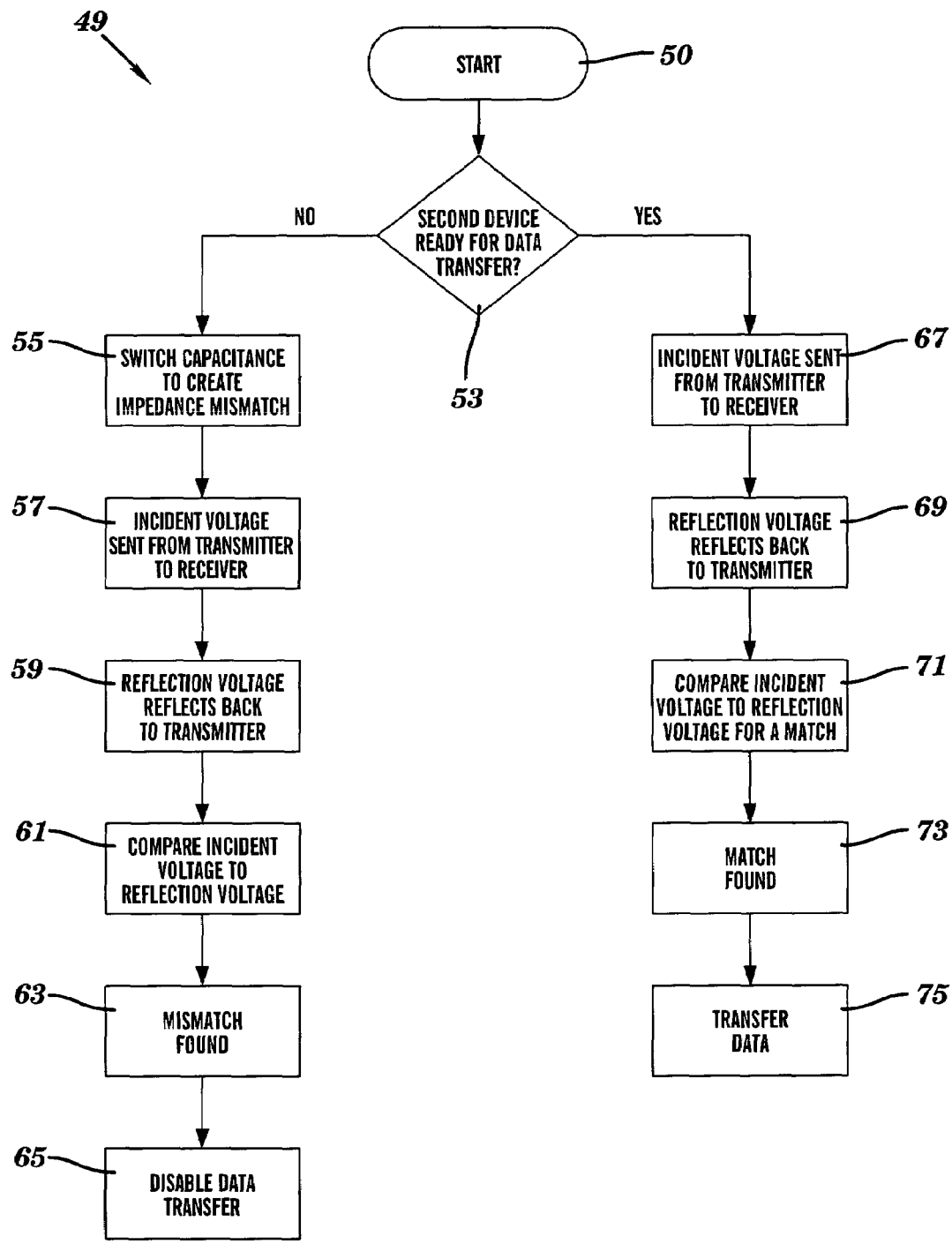
FIG. 2 is a flowchart for controlling the data transfer of FIG. 1, in accordance with embodiments of the present invention.

FIG. 2 is a flowchart depicting an algorithm 49 for controlling the data transfer of FIG. 1, in accordance with embodiments of the present invention. Step 50 represents a startup process.

If step 53 determines that the second core 25 is ready for data transfer, then the incident voltage is sent from the transmitter 12 to the receiver 14 in step 67. In step 69, the reflected voltage is reflected back to the transmitter 12. In step 71, the voltage comparator 6 compares the incident voltage to the reflected voltage. If the incident voltage is found to be about equal to the reflected voltage in step 73 then the data transfer is initiated in step 75.

If step 53 determines that the second core 25 is not ready for data transfer, then the capacitor 15 is connected to the transmission line 29 in step 55 thereby creating the impedance mismatch. In step 57, the incident voltage is sent from the transmitter 12 to the receiver 14. In step 59, the reflected voltage is reflected back to the transmitter 12. In step 61, the voltage comparator 6 compares the incident voltage to the reflected voltage. If the incident voltage is found to be greater than or less than to the reflected voltage in step 63 then the data transfer is disabled in step 65.

Figure 3:
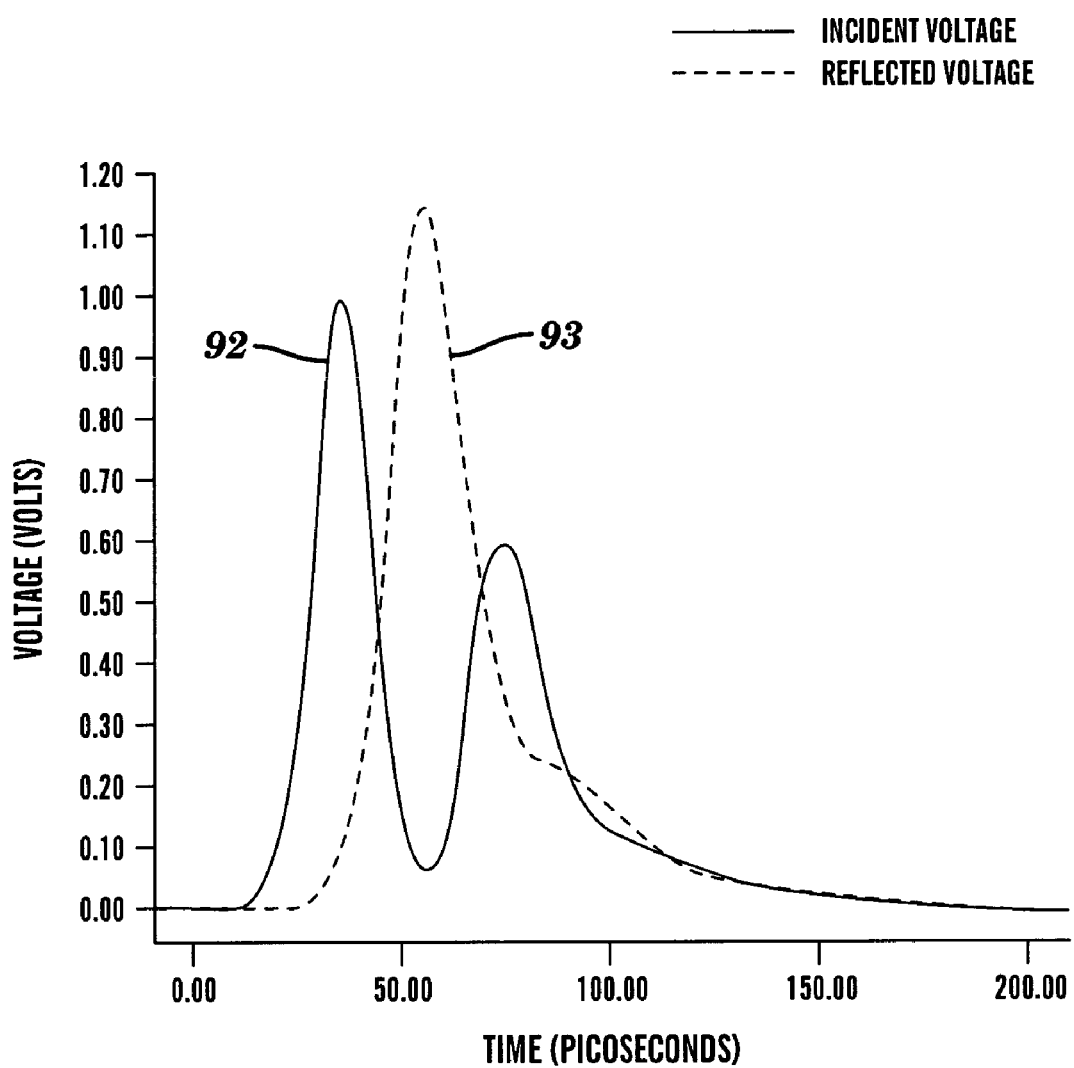
FIG. 3 illustrates a graph of for a matched impedance in the system of FIG. 1, in accordance with embodiments of the present invention.

FIG. 3 illustrates a graph of voltage verses time for a matched impedance in the system 10 of FIG. 1, in accordance with embodiments of the present invention. The Y-axis represents voltage in volts. The X-axis represents time in picoseconds. Note that the amplitude of the incident voltage 92 is about equal to the amplitude of the reflected voltage 93.

Figure 4:
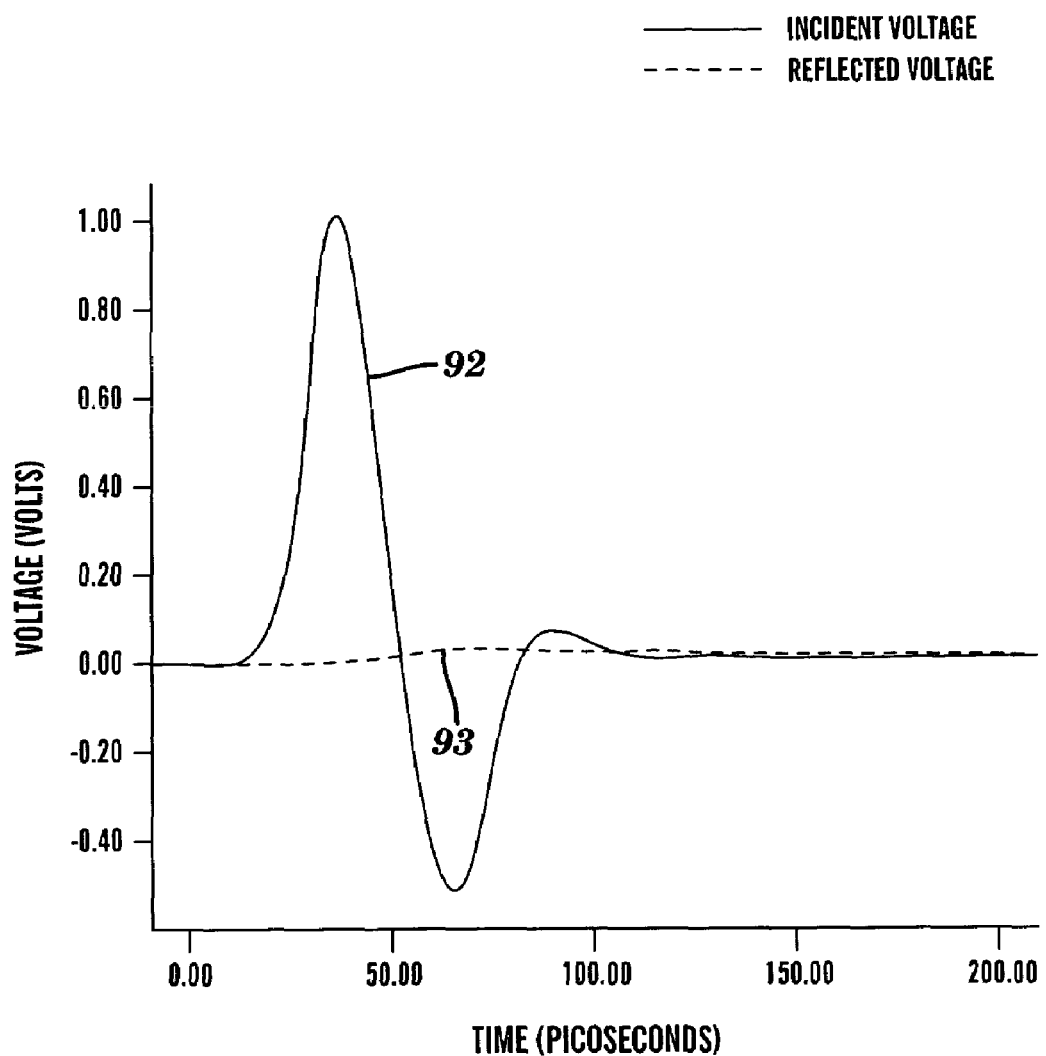
FIG. 4 illustrates a graph of an impedance mismatch in the system of FIG. 1, in accordance with embodiments of the present invention.

FIG. 4 illustrates a graph of voltage verses time for an impedance mismatch in the system 10 of FIG. 1, in accordance with embodiments of the present invention. The Y-axis represents voltage in volts. The X-axis represents time in picoseconds. Note that the amplitude of the incident voltage 92 is much greater than the amplitude of the reflected voltage 93. The amplitude of the incident voltage 92 may be less than the amplitude of the reflected voltage 93 as discussed supra. The amplitudes are determined by a value of the capacitance of the capacitor 15.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A semiconductor device comprising:
a transmitter, receiver, and transmission line formed within the semiconductor device, wherein the transmitter, receiver, and transmission line are adapted to control a data transfer between a first core and a second core within the semiconductor device, wherein each of said transmitter and said receiver is external to said first core and said second core, wherein said transmitter comprises a line driver, wherein said receiver comprises a line receiver, wherein said transmission line electrically connects an output of said line driver to an input of said line receiver, wherein the transmitter is adapted to send a signal over the transmission line to the receiver adapted to receive the signal, wherein the receiver is further adapted to create an impedance mismatch to indicate that the second core is busy performing functions and is unable to transfer the data, wherein the transmitter is adapted to detect the impedance mismatch, wherein the receiver comprises a switch and a capacitor, wherein the switch is electrically connected between the transmission line and the capacitor, wherein the switch is for connecting the capacitor to the transmission line, and wherein the capacitor is adapted to change an impedance of the transmission line to create the impedance mismatch.

2. The semiconductor device of claim 1, wherein the transmitter is further adapted to terminate the data transfer upon detection of the impedance mismatch.

3. The semiconductor device of claim 1, wherein the first core and the second core are each selected from the group consisting of a microcontroller, a microprocessor, and an integrated circuit.

4. The semiconductor device of claim 1, wherein the signal is a voltage signal, and wherein the transmitter is adapted to receive a reflection of the voltage signal.

5. The semiconductor device of claim 4, wherein the transmitter comprises a voltage comparator adapted to compare an amplitude of the voltage signal to an amplitude of the reflection of the voltage signal.

6. The semiconductor device of claim 5, wherein the voltage comparator is further adapted generate a control signal and transmit the control signal to the first core.

7. The semiconductor device of claim 6, wherein the control signal is an enable signal adapted to enable the data transfer between the first core and the second core.

8. The semiconductor device of claim 6, wherein the control signal is a disable signal adapted to disable the data transfer between the first core and the second core.

9. The semiconductor device of claim 1, wherein the receiver comprises a controller electrically connected to the switch, and wherein the controller is adapted to enable and disable the switch.

10. A method for controlling data transfer, comprising:
providing a transmitter, a receiver, and a transmission line for controlling the data transfer between a first core and a second core within a semiconductor device, wherein each of said transmitter and said receiver is external to said first core and said second core, wherein said transmitter comprises a line driver, wherein said receiver comprises a line receiver, a switch, and a capacitor, wherein the switch is electrically connected between the transmission line and the capacitor, and wherein said transmission line electrically connects an output of said line driver to an input of said line receiver;

sending, by the transmitter, a signal over the transmission line to the receiver;

connecting, by the switch, the capacitor to the transmission line;

changing, by the capacitor, an impedance of the transmission line to create an impedance mismatch to indicate that the second core is busy performing functions and is unable to transfer the data between the first core and the second core; and detecting, by the transmitter, the impedance mismatch.

11. The method of claim 10, further comprising terminating by the transmitter, the data transfer upon detection of the impedance mismatch.

12. The method of claim 10, wherein the signal is a voltage signal; and receiving by the transmitter, a reflection of the voltage signal.

13. The method of claim 12, wherein the transmitter comprises a voltage comparator; and comparing by the voltage comparator, an amplitude of the voltage signal to an amplitude of the reflection of the voltage signal.

14. The method of claim 13, farther comprising:

generating by the voltage comparator, a control signal; and transmitting by the voltage comparator the control signal to the first core.

15. The method of claim 14, wherein the control signal is a disable signal, and further comprising disabling by the disable signal, the data transfer between the first core and the second core.

16. The method of claim 10, further comprising:

creating by the receiver, an impedance match to indicate that the second core is able to transfer the data between the first core and the second core; and detecting by the transmitter, the impedance match.

17. The method of claim 10, wherein the first core and the second core are selected from the group consisting of a microcontroller, a microprocessor, and an integrated circuit.

18. The semiconductor device of claim 10, wherein the receiver comprises a controller electrically connected to the switch, and wherein the method further comprises:

enabling or disabling, by said controller, the switch.

* * * * *